United States Patent

Behr et al.

[11] Patent Number: 5,217,927
[45] Date of Patent: * Jun. 8, 1993

[54] HIGHLY REFRACTIVE, LOW-DENSITY, PHOTOTROPIC GLASS

[75] Inventors: Werner Behr; Reinhard Kassner, both of Alfeld/L., Fed. Rep. of Germany

[73] Assignee: Deutsche Spezialglas Aktiegesellschaft, Delligsen, Fed. Rep. of Germany

[*] Notice: The portion of the term of this patent subsequent to Apr. 14, 2009 has been disclaimed.

[21] Appl. No.: 774,501

[22] Filed: Oct. 10, 1991

Related U.S. Application Data

[63] Continuation of Ser. No. 384,625, Jul. 25, 1989, Pat. No. 5,104,831.

[30] Foreign Application Priority Data

Jul. 25, 1988 [DE] Fed. Rep. of Germany ....... 3825210

[51] Int. Cl.$^5$ .......................... B03C 4/06; B03C 3/11; B03C 3/064
[52] U.S. Cl. ........................................ 501/13; 501/56; 501/77; 501/903
[58] Field of Search ...................... 501/13, 56, 77, 903

[56] References Cited

U.S. PATENT DOCUMENTS 4,980,318 12/1990 Araujo ................................. 501/13
5,023,209 6/1991 Grateau et al. ........................ 501/17

Primary Examiner—Mark L. Bell
Assistant Examiner—Deborah Jones
Attorney, Agent, or Firm—Millen, White, Zelano & Branigan

[57] ABSTRACT

A highly refractive, low-density phototropic glass in which the carriers of phototropy are precipitates containing silver, halogens and copper oxide, and which has a density equal to or less than 3.0 g/cm$^3$, a refractive index equal to or greater than 1.60 and an Abbe number equal to or greater than 40, consisting essentially of, in % by weight on an oxide basis:

| | |
|---|---|
| $SiO_2$ | 35–50 |
| $B_2O_3$ | 13.5–21 |
| $\Sigma SiO_2$ and $B_2O_3$ | 50–70 |
| $Li_2O$ | 0.0–2.5 |
| $Na_2O$ | 0.0–4.0 |
| $K_2O$ | 0.0–10.0 |
| $\Sigma$Alkali metal oxides | 4–14 |
| $BaO_2$ | 5.0–10.5 |
| $TiO_2$ | 3.5–6.5 |
| $ZrO_2$ | 4.5–9.5 |
| $Nb_2O_3$ | 5.0–11.5, | the total of the foregoing oxides being 100% by weight, and in addition to the basic glass composition, carriers of phototropy consisting essentially of, in % by weight:

| | |
|---|---|
| $Ag_2O$ | 0.05–0.25 |
| Br | 0.07–0.25 |
| Cl | 0.06–0.35 |
| $\Sigma$Br and Cl | $\leq 0.5$ |
| CuO | 0.003–0.015. |

17 Claims, No Drawings

HIGHLY REFRACTIVE, LOW-DENSITY, PHOTOTROPIC GLASS

This is a continuation of application Ser. No. 07/384,625 filed Jul. 25, 1989, now U.S. Pat. No. 5,104,831.

FIELD OF INVENTION

This invention relates in general to a highly refractive, low-density phototropic glass and, more particularly, to such a phototropic glass which can be used as spectacle glass in which the carriers of phototropy are precipitates containing silver, halogens and copper oxide, and which possesses a density equal to or less than 3 g/cm$^3$.

BACKGROUND OF THE INVENTION

Phototropic glasses are at the present time used predominantly as spectacle sunglasses and are also increasingly finding popularity in corrective prescription lenses for defective eyesight. For correction of defective eyesight with glass having a customary refractive index of 1.523, the spectacle lenses become progressively thicker and heavier at higher diopters (more serious sight defects). For this reason, highly refractive, low-density spectacle lenses have been developed which are sufficiently light in weight to be not unpleasant to wear, even in the case of relatively large optical corrections.

Initially, it became possible to combine the criteria of phototropy, low density, low dispersion and high refractive index in a phototropic glass (German Auslegeschrift 3,117,000) in which the phototropy glass has optical properties n$_D$ equal to or greater than 1.59, an Abbe number equal to or greater than 40 and a density equal to or less than 3.2 g/cm$^3$.

An improved low-density, lightweight phototropic glass is described in German Patent Specification 3,206,958. In order to achieve suitable phototropy kinetics, i.e., a rapid darkening when exposed to solar radiation and lightening in the absence of such exposure, these glasses have a relatively high halide content. In general, a halide content on the order of approximately 1.5%, calculated as halogen, is needed in order to achieve useful phototropic kinetics after tempering. When these glasses containing a halide component, i.e., chlorine, bromine, etc., are melted, substantial amounts of the halide component vaporize in a somewhat irregular manner, resulting in a nonhomogeneous glass. The vaporization of the halide component is especially pronounced when the glass contains lead oxide and/or zinc oxide. Consequently, in the production of such glass, it is difficult due to uneven halide vaporization to produce a homogenous glass having uniform properties.

OBJECTS OF THE INVENTION

A principle object of the invention is to provide a highly refractive, low-density, phototropic glass which can be produced with essentially uniform properties.

Another object is to provide a highly refractive, low-density, phototropic glass having a relatively low halide content which can be melted to form a homogenous glass without harmful vaporization of the halide component.

Upon further study of the specification and appended claims, further objects and advantages of this invention will become apparent to those skilled in the art.

SUMMARY OF THE INVENTION

A highly refractive, low-density phototropic glass is provided in which the carriers of phototropy are precipitates containing silver, halogens and copper oxide, the glass has a refractive index equal to or greater than 1.6, and Abbe number equal to or greater than 40 and a density equal to or less than 3.0 g/cm$^3$, and consists essentially of, in % by weight on an oxide basis:

| | |
|---|---|
| SiO$_2$ | 35–50 |
| B$_2$O$_3$ | 13.5–21 |
| ΣSiO$_2$ and B$_2$O$_3$ | 50–70 |
| Li$_2$O | 0.0–2.5 |
| Na$_2$O | 0.0–4.0 |
| K$_2$O | 0.0–10.0 |
| ΣAlkali metal oxides | 4–14 |
| BaO | 5.0–10.5 |
| TiO$_2$ | 3.5–6.5 |
| ZrO$_2$ | 4.5–9.5 |
| Nb$_2$O$_3$ | 5.0–11.5, | the total of the foregoing oxides being 100% by weight, and in addition to the basic glass composition, carriers of phototropy consisting essentially of, in % by weight:

| | |
|---|---|
| Ag$_2$O | 0.05–0.25 |
| Br | 0.07–0.25 |
| Cl | 0.06–0.35 |
| ΣBr and Cl | ≦0.5 |
| CuO | 0.003–0.015 |

The phototropic glass of the present invention is doped with gold or a platinum metal, preferably palladium, in an amount effective to achieve a brown coloration when the phototropic glass is exposed to actinic radiation. The concentration of phototropic carriers are considered additively over and above the basic glass composition. The phototropic glass of the present invention can also contain up to 1.5% by weight of coloring oxides. In a preferred embodiment, the coloring oxide comprise up to 1 wt.% Er$_2$O$_3$, Nd$_2$O$_3$ and/or 0.1 wt. % CoO, 0.3 wt. % NiO or 0.1 wt. % Cr$_2$O$_3$.

When the silver halide-containing phototropic glasses according to this invention are exposed to actinic radiation, photolysis occurs in the silver halide-containing precipitates. The silver which is created in this process grows into silver colloids which absorb light in the range of the visible spectrum. The glass reverts to its initial state when it is no longer exposed to actinic radiation.

DETAILED DESCRIPTION OF THE INVENTION

According to the invention, a highly refractive, low-density, phototropic glass having uniform properties can be produced by using as the basic glass composition, in % by weight on an oxide basis:

| | |
|---|---|
| SiO$_2$ | 35–50 |
| B$_2$O$_3$ | 13.5–21 |
| ΣSiO$_2$ and B$_2$O$_3$ | 50–70 |
| Li$_2$O | 0.0–2.5 |
| Na$_2$O | 0.0–4.0 |
| K$_2$O | 0.0–10.0 |
| ΣAlkali metal oxides | 4–14 |
| BaO | 5.0–10.5 |
| TiO$_2$ | 3.5–6.5 |

| | |
|---|---|
| ZrO$_2$ | 4.5-9.5 |
| Nb$_2$O$_5$ | 5.0-11.5, | the total of the foregoing oxides being 100% by weight, and in addition to the basic glass composition, carriers of phototropism consisting essentially of, in % by weight:

| | |
|---|---|
| Ag$_2$O | 0.05-0.25 |
| Br | 0.07-0.25 |
| Cl | 0.06-0.35 |
| ΣBr and Cl | ≦0.5 |
| CuO | 0.003-0.015. |

Apart from unavoidable raw material impurities, the basic glass composition of the present invention omits the conventional glass components of lead, cadmium and zinc. The glass of the present invention is also free from most other conventional glass components, such as Al$_2$O$_3$, SrO, CaO and MgO.

Surprisingly, it has been found that a very low halogen content (total halogens equal to or less than 0.5% by weight) can be used in forming a highly refractive, low density, phototropic basic glass composition in the absence of the oxides of zinc, lead, strontium, calcium and magnesium. It has been found that the omission of the above-mentioned components, and particularly Al$_2$O$_3$, unexpectedly improves the resistance of the glass to household acids such as fruit acids, etc. After tempering, a glass is obtained which is suitable for use as spectacle glass, i.e., which is free from turbidity and has excellent phototropic kinetics.

A preferred basic glass composition has the following composition express in % by weight, on an oxide basis:

| | |
|---|---|
| SiO$_2$ | 44-49 |
| B$_2$O$_3$ | 14-18 |
| ΣSiO$_2$ and B$_2$O$_3$ | 58-67 |
| Li$_2$O | 1-2 |
| Na$_2$O | 0-4 |
| K$_2$O | 2-8 |
| ΣAlkali metal oxides | 4-14 |
| BaO | 5-10.5 |
| TiO$_2$ | 4-6 |
| ZrO$_2$ | 4.5-8 |
| Nb$_2$O$_5$ | 7-11. |

This basic glass composition is particularly preferred for a number of reasons. First, it has optimal chemical stability and can be produced at relatively low cost. Second, it is sufficiently resistant to divitrification that it can be processed in continuously operated vats to produce high quality spectacle glasses.

In order to achieve the brown coloration in the exposed condition, the glass is preferably doped, with from about 1-3 ppm of gold or one or more of the platinum metals, preferably with palladium. The substance used to dope the glass is added in amounts sufficient to achieve a brown coloration when the phototropic glass is exposed to actinic radiation. It is also preferred to impart to the glass a basic coloration, e.g., by addition of up to about 1.5% by weight of coloring oxides. In a preferred embodiment, coloring oxides are added in amounts of: up to 1% by weight Er$_2$O$_3$, Nd$_2$O$_3$ and/or 0.1% by weight CoO, 0.3% by weight NiO or 0.1% by weight Cr$_2$O$_3$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding German application P 38 25 210.4-45, are hereby incorporated by reference.

EXAMPLES

Example 1

A basic glass composition was prepared according to the invention by weighing out and mixing the components listed in Example 1 of Table 1. The resulting frit is placed in a 1 l-platinum crucible at 1350° C. and smelted down for a period of 7 hours. The melt was then tempered at 620°-640° C. for 2.5 hours, followed by cooling to room temperature at a cooling rate of 0.7 K/min.

In this glass, the following characteristic data were measured:

| | |
|---|---|
| Refractive index (n$_D$) at a wavelength of 589 nm | 1.6031 |
| Refractive index (n$_e$) at a wavelength of 546 nm | 1.6066 |
| Density (g/cm$^3$) | 2.78 |
| Dispersion ($v_D$) at a wavelength of 589 nm | 42.3 |
| Dispersion ($v_e$) at a wavelength of 546 nm | 42.1 |

Measurements of the phototropic data taken at 23° C. from a 2 mm thick glass sample showed a saturation transmissivity of 32%, and a transmission of 78.9% after a 30-minute recovery time.

Table 1 also shows other examples (2-11) of glasses made according to this invention in % by weight. Silver oxide, bromine, chlorine and copper oxide were added during the synthesis to all of these glasses in the amounts shown in Table 1.

The listed examples in Table 1 satisfy all of the requirements for a highly refractive, low-density phototropic spectacle glass. These glasses also have the ability to be coated with a nonreflecting substance. In addition, these glasses have an increased resistance to fruit juices and other household substances which can react with glass causing marring or discoloration.

In Table 1, n$_D$ and $v_D$ are the refractive indices and Abbe number, respectively, measured at a wavelength of 589 nm. n$_e$ and $v_e$ are the refractive indices and Abbe number, respectively, measured at a wavelength of 546 nm. D is the density in g/cm$^3$. ST is the saturation transmissivity in % (measured at 545 nm), and TR 30 is the transmission value in % which the glass achieves after regeneration for 30 minutes. All phototropy data were obtained from 2 mm thick test pieces at 23° C.

TABLE 1

| | Example No. | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 46.00 | 48.55 | 45.55 | 45.25 | 40.61 | 45.90 | 45.90 | 45.35 | 47.25 | 46.80 | 47.1 |
| $B_2O_3$ | 15.85 | 13.50 | 16.50 | 15.55 | 19.47 | 15.60 | 15.60 | 15.40 | 15.05 | 14.90 | 15.0 |
| $Li_2O$ | 1.75 | 1.66 | 1.66 | 1.72 | 1.66 | 1.72 | 1.73 | 1.71 | 1.67 | 1.65 | 1.66 |
| $Na_2O$ | 3.37 | 1.81 | 1.81 | 2.92 | 3.81 | 1.88 | 1.88 | 1.86 | 0.81 | 1.80 | 1.81 |
| $K_2O$ | 5.17 | 5.27 | 5.27 | 3.92 | 5.28 | 5.49 | 5.49 | 5.43 | 6.40 | 3.26 | 5.28 |
| $BaO$ | 6.85 | 8.00 | 8.00 | 8.30 | 8.83 | 8.30 | 8.30 | 8.25 | 8.00 | 9.95 | 8.00 |
| $TiO_2$ | 4.20 | 5.00 | 5.00 | 4.15 | 4.50 | 4.70 | 4.70 | 4.65 | 5.50 | 5.45 | 5.0 |
| $ZrO_2$ | 6.85 | 7.45 | 7.45 | 6.75 | 6.48 | 6.75 | 6.75 | 7.70 | 7.50 | 4.80 | 7.48 |
| $Ag_2O$ | 0.201 | 0.145 | 0.145 | 0.187 | 0.17 | 0.187 | 1.087 | 0.185 | 0.160 | 0.154 | 0.16 |
| Br | 0.106 | 0.200 | 0.200 | 0.239 | 0.19 | 0.256 | 0.256 | 0.236 | 0.150 | 0.229 | 0.20 |
| Cl | 0.349 | 0.190 | 0.290 | 0.259 | 0.23 | 0.208 | 0.208 | 0.257 | 0.191 | 0.189 | 0.19 |
| CuO | 0.0084 | 0.0100 | 0.0100 | 0.0083 | 0.08 | 0.0083 | 0.0083 | 0.0123 | 0.0120 | 0.0099 | 0.01 |
| $Nb_2O_5$ | 9.25 | 8.25 | 8.25 | 10.75 | 8.75 | 9.10 | 9.10 | 9.00 | 7.30 | 10.85 | 8.25 |
| $n_D$ | 1.6031 | 1.6033 | 6.6033 | 1.6055 | 1.6064 | 1.6023 | 1.6037 | 1.6060 | 1.6024 | 1.6060 | 1.6030 |
| $v_D$ | 42.3 | 43.1 | 42.9 | 41.9 | 41.9 | 41.8 | 42.3 | 42.4 | 42.9 | 42.1 | 42.9 |
| $n_e$ | 1.6066 | 1.6068 | 1.6068 | 1.6090 | 1.6094 | 1.6059 | 1.6072 | 1.6096 | 1.6059 | 1.6095 | 1.6064 |
| $v_e$ | 42.1 | 42.8 | 42.7 | 41.7 | 41.7 | 41.5 | 42.0 | 42.1 | 42.6 | 41.9 | 42.7 |
| D (g/cm$^3$) | 2.78 | 2.78 | 2.77 | 2.80 | 2.76 | 2.76 | 2.77 | 2.78 | 2.76 | 2.79 | 2.77 |
| ST | 32.0 | 30.2 | 31.3 | 28.5 | 29.1 | 29.1 | 24.1 | 36.8 | 40.7 | 33.2 | 27.5 |
| TR 30 | 78.9 | 80.5 | 81.0 | 82.1 | 79.0 | 80.3 | 79.7 | 81.0 | 80.7 | 81.5 | 79.5 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing form the spirit and scope thereof, can make various changes and modification of the invention to adapt it to various usages and conditions.

What is claimed is:

1. A highly refractive, low-density, phototropic glass in which the carriers of phototropy are precipitates containing silver, halogens and copper oxide, and which has a density equal to or less than 3.0 g/cm$^3$, a refractive index equal to or greater than 1.60 and an Abbe number equal to or greater than 40, consisting essentially of, in % y weight of an oxide basis:

| | |
|---|---|
| $SiO_2$ | 35–50 |
| $B_2O_3$ | 13.5–21 |
| $\Sigma SiO_2$ and $B_2O_3$ | 50–70 |
| $Li_2O$ | 0.0–2.5 |
| $Na_2O$ | 0.0–4.0 |
| $K_2O$ | 0.0–10.0 |
| $\Sigma$Alkali metal oxides | 4–14 |
| BaO | 5.0–10.5 |
| $TiO_2$ | 3.5–6.5 |
| $ZrO_2$ | 4.5–9.5 |
| $Nb_2O_3$ | 5.0–11.5, | and in addition to the basic glass composition, carriers of phototropism consisting essentially of, in % by weight:

| | |
|---|---|
| $Ag_2O$ | 0.05–0.25 |
| Br | 0.07–0.25 |
| Cl | 0.06–0.35 |
| $\Sigma$Br and Cl | $\leq 0.5$ |
| CuO | 0.003–0.015. |

2. A highly refractive phototropic glass of claim 1, consisting essentially of, in % by weight on an oxide basis:

| | |
|---|---|
| $SiO_2$ | 44–49 |
| $B_2O_3$ | 14–18 |
| $\Sigma SiO_2$ and $B_2O_3$ | 58–67 |
| $Li_2O$ | 1–2 |
| $Na_2O$ | 0–4 |
| $K_2O$ | 2–8 |
| $\Sigma$Alkali metal oxides | 4–14 |
| BaO | 5–10.5 |
| $TiO_2$ | 4–6 |
| $ZrO_2$ | 4.5–8 |
| $Nb_2O_3$ | 7–11. |

3. A highly refractive phototropic glass of claim 1, which is doped with from about 1 to 3 ppm of gold effective to achieve a brown coloration when the phototropic glass is exposed to actinic light.

4. A highly refractive phototropic glass of claim 1, which is doped with an amount of up to about 1.5% by weight of coloring oxides effective to color the glass in the unirradiated state.

5. A highly refractive phototropic glass of claim 2, which is doped with from about 1 to 3 ppm of gold effective to achieve a brown coloration when the phototropic glass is exposed to actinic light.

6. A highly refractive phototropic glass of claim 2, which is doped with an amount of up to about 1.5% by weight of coloring oxides effective to color the glass in the unirradiated state.

7. A highly refractive phototropic glass of claim 1, which is doped with one or more platinum metals in an amount effective to achieve brown coloration when the phototropic glass is exposed to actinic radiation.

8. A highly refractive phototropic glass of claim 2, which is doped with one or more platinum metals in an amount effective to achieve a brown coloration when the phototropic glass is exposed to actinic radiation 9. A highly refractive phototropic glass of claim 1, which is doped with palladium in an amount effective to achieve a brown coloration when the phototropic glass is exposed to actinic radiation.

10. A highly refractive phototropic glass of claim 2, which is doped with palladium in an amount effective to achieve a brown coloration when the phototropic glass is exposed to actinic radiation.

11. A highly refractive phototropic glass of claim 4, wherein the coloring oxides are present in amounts of up to 1 wt. % $Er_2O_3$, $Nd_2O_3$ and/or 0.1 wt. % CoO, 0.3 wt. % NiO or 0.1 wt. % $Cr_2O_3$.

12. A highly refractive phototropic glass of claim 6, wherein the coloring oxides are present in amounts of up to 1 wt. % $Er_2O_3$, $Nd_2O_3$ and/or 0.1 wt. % CoO, 0.3 wt. % NiO or 0.1 wt. % $Cr_2O_3$.

13. Eye glasses having spectacle lenses comprising the phototropic glass of claim 1.

14. Eye glasses having spectacle lenses comprising the phototropic glass of claim 2.

15. Eye glasses having spectacle lenses comprising the phototropic glass of claim 7.

16. Eye glasses having spectacle lenses comprising the phototropic glass of claim 10.

17. A highly refractive, low density phototropic glass in which the carriers are precipitations containing silver, halogens and copper oxide and which has a density equal to or less than 3.0 g/cm$^3$, a refractive index equal to or greater than 1.60 and an Abbe number equal to or greater than 40, consisting essentially of, in % by weight on an oxide basis:

| | |
|---|---|
| $SiO_2$ | 35–50 |
| $B_2O_3$ | 13.5–21 |
| $\Sigma SiO_2$ and $B_2O_3$ | 50–70 |
| $LiO_2$ | 0.0–2.5 |
| $Na_2O$ | 0.0–4.0 |
| $K_2O$ | 0.0–10.0 |
| $\Sigma$Alkali metal oxides | 4–14 |
| BaO | 5.0–10.5 |
| $TiO_2$ | 3.5–6.5 |
| $ZrO_2$ | 4.5–9.5 |
| $Nb_2O_5$ | 5.0–11.5. |

* * * * *